United States Patent
Emmons

(10) Patent No.: US 8,127,786 B2
(45) Date of Patent: Mar. 6, 2012

(54) PROPORTIONAL SELECTOR VALVE FOR SELECTING BETWEEN TWO PRESSURE SOURCES

(75) Inventor: Floyd Richard Emmons, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1007 days.

(21) Appl. No.: 12/062,063

(22) Filed: Apr. 3, 2008

(65) Prior Publication Data
US 2009/0250128 A1 Oct. 8, 2009

(51) Int. Cl.
*F16K 11/02* (2006.01)
*G05D 11/02* (2006.01)

(52) U.S. Cl. .................... 137/112; 137/115.13

(58) Field of Classification Search ........... 137/98, 137/99, 100, 112, 113, 114, 115.13, 115.15, 137/116.3
See application file for complete search history.

(56) References Cited

U.S. PATENT DOCUMENTS

| | | | | |
|---|---|---|---|---|
| 2,761,388 A | * | 9/1956 | Peterson | 137/114 |
| 2,912,994 A | * | 11/1959 | Mori | 137/98 |
| 2,971,524 A | * | 2/1961 | Ruhl | 137/115.15 |
| 3,273,583 A | * | 9/1966 | Carlton | 137/112 |
| 3,338,257 A | * | 8/1967 | Ferguson | 137/112 |
| 3,424,057 A | * | 1/1969 | Schweizer | 137/115.13 |
| 3,752,176 A | * | 8/1973 | King | 137/100 |
| 3,925,987 A | * | 12/1975 | Faisandier | 137/112 |
| 4,068,678 A | * | 1/1978 | Lang et al. | 137/100 |
| 4,253,481 A | * | 3/1981 | Sarlls, Jr. | 137/112 |
| 4,281,677 A | * | 8/1981 | Hoffman | 137/113 |
| 4,889,152 A | * | 12/1989 | Wilson | 137/113 |
| 5,592,972 A | | 1/1997 | Niethammer | |
| 6,173,729 B1 | * | 1/2001 | Dey et al. | 137/113 |
| 6,269,827 B1 | | 8/2001 | Potter | |
| 6,289,921 B1 | | 9/2001 | Neuhaus et al. | |
| 6,408,883 B2 | | 6/2002 | Motoki et al. | |
| 6,583,525 B2 | | 6/2003 | Dyer et al. | |
| 6,662,819 B1 | * | 12/2003 | Watson | 137/113 |
| 6,789,562 B2 | | 9/2004 | Dyer et al. | |
| 6,886,665 B2 | | 5/2005 | Parsons et al. | |
| 7,073,533 B2 | | 7/2006 | Bruck et al. | |
| 7,159,614 B2 | | 1/2007 | Tiziani et al. | |
| 7,175,100 B2 | | 2/2007 | Eveleigh et al. | |

* cited by examiner

*Primary Examiner* — John Rivell
(74) *Attorney, Agent, or Firm* — Carlson, Gaskey & Olds, PC

(57) ABSTRACT

A selector valve selects between the supply of a primary pressure supply and a secondary pressure supply to a downstream use. The selector valve moves between a first position at which it supplies fluid from a primary line to the use, and a second position at which it supplies fluid only from a secondary line to the use. The selector valves moves through an intermediate position at which fluid is supplied from both supplies to the use.

18 Claims, 1 Drawing Sheet

PROPORTIONAL SELECTOR VALVE FOR SELECTING BETWEEN TWO PRESSURE SOURCES

BACKGROUND OF THE INVENTION

This application relates to a selector valve for selecting between two pressure sources to be delivered to a downstream use, wherein the selector valve has positions at which it delivers solely from each of the two sources, but has an intermediate position at which it mixes the two sources to be delivered to the use.

Selector valves are known, and are typically utilized to supply a fluid from alternate sources to a downstream use. In one proposed application, two distinct oil pumps deliver oil to the selector valve. The selector valve selects between the two oil supplies, and delivers the oil to a downstream use. In one application this downstream use is a gear box for a geared architecture gas turbine engine.

The purpose of this selector valve is to ensure that adequate oil is supplied. Thus, there is a primary oil pump that will typically be delivered through the selector valve to the gear box. However, if the pressure of this primary oil pump drops below a predetermined level, the selector valve will move toward another position at which it will deliver oil from a secondary oil pump.

Selector valves such as mentioned above typically toggle or snap between the two extreme positions. Thus, they tend to oscillate between the two positions, creating unwanted noise, and a non-smooth operation.

SUMMARY OF THE INVENTION

In the disclosed embodiment of this invention, a selector valve selects between two distinct pressure sources to be delivered to a downstream use. As the selector valve moves from one of two positions to the other, it moves through an intermediate position at which it delivers fluid from both sources to the use.

These and other features of the present invention can be best understood from the following specification and drawings, the following of which is a brief description.

DETAILED DESCRIPTION OF THE PREFERRED EMBODIMENT

Figure 1:
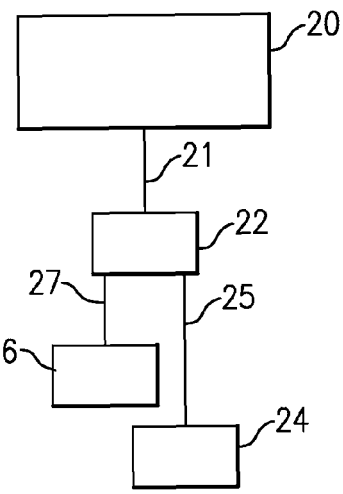
FIG. 1 is a schematic view of a system incorporating a selector valve.

An oil supply system for a gear box 20 for a geared architecture gas turbine engine is illustrated in FIG. 1. Oil is supplied through a line 21 to the gear box 20. A selector valve 22 alternatively selects oil from a primary oil pump 24 and a secondary oil pump 26. Primary oil pump 24 delivers oil through the line 25 to the selector valve, and secondary oil pump 26 delivers oil to the selector valve through a line 27.

Figure 2:
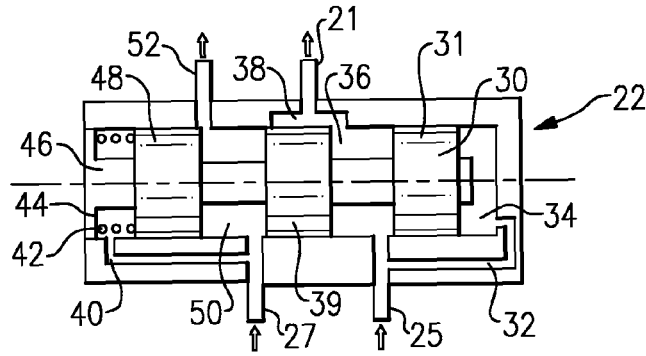
FIG. 2 shows a selector valve in a first position.

As shown in FIG. 2, the selector valve 22 is in its normal operational position. Oil passes from the line 25 into a chamber 36, into a supply window 38, and then to the supply line 21. As can be also appreciated, a tap 32 takes oil from the supply line 25 into a chamber 34 on one side of a piston 30. The piston 30 further has a sealing land 39, and an opposed land 48. The piston has a land 31 facing chamber 34.

The secondary supply line 27 communicates oil into a chamber 50. With the piston in the position shown in FIG. 2, oil in the chamber 50 is delivered directly into a bypass line 52. Also, oil from the secondary supply line 27 passes through a tap 40 into a chamber 44. Also in chamber 44 is a spring 42, and a stop 46.

As long as the pressure of the oil from the main supply line 25 is sufficient to overcome the force from the secondary oil in chamber 44, and the spring 42, the piston 30 remains in the position illustrated in FIG. 2. The sealing land 39 blocks communication of oil from the secondary supply line 27 to the window 38. Oil from the primary oil pump is delivered to the line 21.

Figure 3:
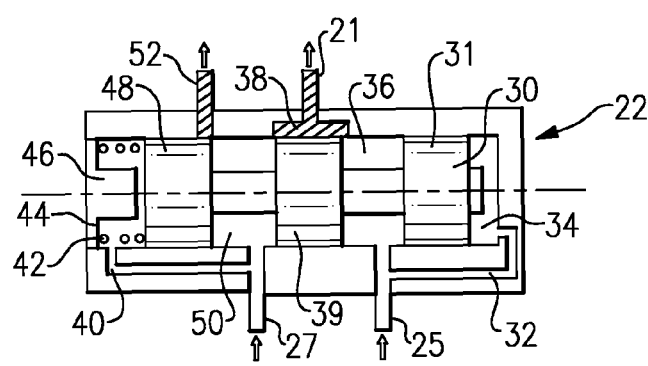
FIG. 3 shows a selector valve in an intermediate position.

However, if the pressure begins to drop, the piston moves through the position shown in FIG. 3. As it does move to this position, the sealing land 39 no longer seals chamber 50 from window 38. At the same time, since the sealing land 39 extends for an axial distance that is less than the size of the window 38, the chamber 36 also communicates with the window 38. In this position, there is a proportional mixture of oil from the two supply lines 25 and 27 being delivered to the line 21 heading to the downstream use.

Figure 4:
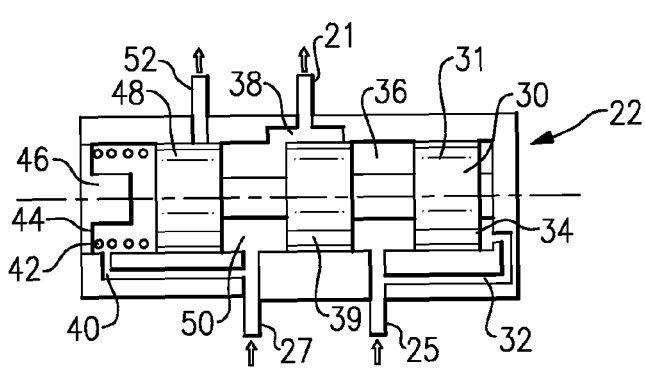
FIG. 4 shows a selector valve in yet another position.

If the pressure of the primary oil supply at line 25 continues to drop, the piston 30 continues to moves to the right until it reaches the position shown in FIG. 4. At this point the sealing land 39 blocks communication of the chamber 36 to the window 38. Also, the land 48 has blocked the secondary bypass 52. Oil from the secondary oil pump is now delivered to the line 21.

This selector valve will not snap or toggle between the two extreme positions, but instead will move smoothly through the mixture position such as shown in FIG. 3. While this application discusses and illustrates three "positions," of course, in real life, the piston moves through an infinite number of positions within the valve housing. The positions as illustrated and claimed in this application merely illustrate that there are intermediate locations at which the valve will proportionally mix the fluid from the two sources.

While this application does describe the valve utilized in an oil supply system for a gear box, many other applications would be apparent for the inventive valve. Also, the valve can be utilized to proportionally mix and select between sources of fluids other than oil.

Although embodiments have been disclosed, a worker of ordinary skill in this art would recognize that certain modifications would come within the scope of this invention. For that reason, the following claims should be studied to determine the true scope and content of this invention.

What is claimed is:

1. A selector valve for selecting between two pressure sources to be delivered to a downstream use comprising:
    a valve housing;
    a piston movable within a bore in said valve housing;
    a first supply line for communicating a primary supply into a first chamber;
    a second supply line to communicate a secondary supply into a second chamber, and a window to communicate to a line leading to a downstream use for the supply;
    said piston being operable to move between a first position at which it connects said first chamber to said window, and blocks communication between said second chamber to said window, a second position at which it connects said second chamber to said window and blocks communication between said first chamber to said window, and a third position which is intermediate said first and second positions, and which connects both of said first and second chambers to said window, said valve moving through said third position as it moves between said first and second positions; and said second chamber communicating to a bypass line when said piston is in said first position.

2. The valve as set forth in claim 1, wherein said piston includes a first land for seeing the pressure from said primary supply, a second land for seeing the pressure from said secondary supply, and a sealing third land for selectively blocking communication between said first and second chamber and said window.

3. The valve as set forth in claim 2, wherein said sealing third land extends for an axial distance that is less than an axial distance of said window such that said window can communicate with both said first and second chambers while said piston is in said third position.

4. The valve as set forth in claim 2, wherein said second land sees a pressure from secondary supply and a spring force.

5. The valve as set forth in claim 1, wherein the fluid from the two supply lines is proportionally mixed in the third position.

6. The valve as set forth in claim 1, wherein the two pressure sources are oil pumps.

7. A selector valve for selecting between two pressure sources to be delivered to a downstream use comprising:
a valve housing;
a piston movable within a bore in said valve housing;
a first supply line for communicating a primary supply into a first chamber;
a second supply line to communicate a secondary supply into a second chamber, and a window to communicate to a line leading to a downstream use for the supply; said piston being operable to move between a first position at which it connects said first chamber to said window, and blocks communication between said second chamber to said window, a second position at which it connects said second chamber to said window and blocks communication between said first chamber to said window, and a third position which is intermediate said first and second positions, and which connects both of said first and second chambers to said window, said valve moving through said third position as it moves between said first and second positions;
said second chamber communicating to a bypass line when said piston is in said first position;
said piston includes a first land for seeing the pressure from said primary supply, a second land for seeing the pressure from said secondary supply, and a sealing third land for selectively blocking communication between said first and second chamber and said window; and
a tap extends from said primary supply to a side of said first land which is remote from said first chamber.

8. The valve as set forth in claim 7, wherein a tap from said secondary supply extends to an opposed side of said second land from said second chamber.

9. The valve as set forth in claim 7, wherein said second chamber communicating to a bypass line when said piston is in said first position.

10. An oil supply system for a gear box of a gas turbine engine comprising:
a first pump for delivering oil into a first supply line;
a second pump for delivering oil into a second supply line;
an outlet line for delivering oil to a gear box;
a selector valve positioned between said first and second supply lines and said outlet line, said selector valve having a valve housing, a piston movable within a bore in said valve housing, a first supply line for communicating a primary oil supply into a first chamber, a secondary supply line to communicate a secondary oil supply into a second chamber, and a window to communicate to a line leading to a downstream use for the oil, and said piston being operable to move between a first position at which it supplies oil from said first chamber to said window, and block oil from moving from said second chamber to said window, a second position at which it allows oil to move from said second chamber to said window and blocks oil from moving from said first chamber to said window, and a third position which is intermediate said first and second position, and which allows oil to move from both of said first and second chambers to said window, said valve moving through said third position as it moves between said first and second position; and said second chamber communicating to a bypass line when said piston is in said first position.

11. The system as set forth in claim 10, wherein said piston includes a first land for seeing the pressure from said primary oil supply, a second land for seeing the pressure from said secondary oil supply, and a sealing third land for selectively blocking communication between said first and second chamber and said window.

12. The system as set forth in claim 11, wherein said sealing third land extends for an axial distance that is less than an axial distance of said window such that said window can communicate with both said first and second chambers while said piston is in said third position.

13. The system as set forth in claim 11, wherein said second land sees a pressure from secondary oil supply and a spring force.

14. The system as set forth in claim 10, wherein the valve proportionally mixes the oil from the two supply lines when in the third position.

15. The system as set forth in claim 10, wherein the gear box is associated with a gas turbine engine.

16. An oil supply system for a gear box of a gas turbine engine comprising:
a first pump for delivering oil into a first supply line;
a second pump for delivering oil into a second supply line;
an outlet line for delivering oil to a gear box;
a selector valve positioned between said first and second supply lines and said outlet line, said selector valve having a valve housing, a piston movable within a bore in said valve housing, a first supply line for communicating a primary oil supply into a first chamber, a secondary supply line to communicate a secondary oil supply into a second chamber, and a window to communicate to a line leading to a downstream use for the oil, and said piston being operable to move between a first position at which it supplies oil from said first chamber to said window, and block oil from moving from said second chamber to said window, a second position at which it allows oil to move from said second chamber to said window and blocks oil from moving from said first chamber to said window, and a third position which is intermediate said first and second position, and which allows oil to move from both of said first and second chambers to said window, said valve moving through said third position as it moves between said first and second position;
said second chamber communicating to a bypass line when said piston is in said first position;

said piston includes a first land for seeing the pressure from said primary oil supply, a second land for seeing the pressure from said secondary oil supply, and a sealing third land for selectively blocking communication between said first and second chamber and said window; and a tap extends from said primary oil supply to a side of said first land which is remote from said first chamber.

17. The system as set forth in claim 16, wherein a tap from said secondary oil supply extends to an opposed side of said second land from said second chamber.

18. The system as set forth in claim 16, wherein said second chamber communicating to a bypass line when said piston is in said first position.

* * * * *